US012508821B2

(12) United States Patent
Mingardi et al.

(10) Patent No.: US 12,508,821 B2
(45) Date of Patent: Dec. 30, 2025

(54) APPARATUS FOR DIGITAL PRINTING ON CLOSURES FOR CONTAINERS

(71) Applicant: PELLICONI & C. S.p.A., Ozzano Dell'Emilia (IT)

(72) Inventors: Matteo Mingardi, Bologna (IT); Alberto Debbia, Sassuolo (IT)

(73) Assignee: PELLICONI & C. S.p.A., Ozzano Dell'Emilia (IT)

( * ) Notice: Subject to any disclaimer, the term of this patent is extended or adjusted under 35 U.S.C. 154(b) by 93 days.

(21) Appl. No.: 18/548,362

(22) PCT Filed: Mar. 1, 2022

(86) PCT No.: PCT/IB2022/051773
§ 371 (c)(1),
(2) Date: Aug. 30, 2023

(87) PCT Pub. No.: WO2022/185192
PCT Pub. Date: Sep. 9, 2022

(65) Prior Publication Data

US 2024/0140109 A1 May 2, 2024

(30) Foreign Application Priority Data

Mar. 2, 2021 (IT) ........................ 102021000004874

(51) Int. Cl.
*B41J 3/407* (2006.01)
*B41J 2/21* (2006.01)
(Continued)

(52) U.S. Cl.
CPC ........... *B41J 3/4073* (2013.01); *B41J 2/2103* (2013.01); *B41J 11/00214* (2021.01); *B41J 3/40733* (2020.08); *B67B 3/006* (2013.01)

(58) Field of Classification Search
CPC .. B41J 3/4073; B41J 2/2103; B41J 11/00214; B41J 3/40733; B67B 3/006
See application file for complete search history.

(56) References Cited

U.S. PATENT DOCUMENTS 2,696,285 A 12/1954 Zenlea
2005/0099470 A1* 5/2005 Nishino ................ B41J 2/2114 347/84

(Continued)

FOREIGN PATENT DOCUMENTS

| | | | | |
|---|---|---|---|---|
| CN | 105764699 B * | 6/2017 | .......... | B41J 2/04505 |
| EP | 2993053 A1 | 3/2016 | | |
| GB | 1504598 A | 3/1978 | | |

OTHER PUBLICATIONS

International Search Report and Written Opinion dated Apr. 21, 2022 from counterpart International Patent Application No. PCT/IB2022/051773.

*Primary Examiner* — Justin Seo
(74) *Attorney, Agent, or Firm* — SHUTTLEWORTH & INGERSOLL, PLC; Timothy J. Klima

(57) ABSTRACT

An apparatus for digital printing on closing components for containers, includes a loading container with a hopper containing the closing components from which a conveyor line originates, with the closing components being positioned on the conveyor line by means of a withdrawing device provided with a bowl. A digital printing station situated along the conveyor line includes a digital printing device with ink-jet nozzles provided to reproduce images and/or text on each metal closing component with the help of a position sensor provided to detect the position of the closing components on the conveyor line.
The digital printing device is controlled by a command and control unit, to which the position sensor is connected. A user interface device allows the user to interact with the (Continued)

command and control unit to select and/or modify an image to be printed, on the basis of which control instructions are sent to the digital printing device so that the selected and/or modified image to be printed is reproduced on the closing components.

10 Claims, 4 Drawing Sheets

(51) Int. Cl.
*B41J 11/00* (2006.01)
*B67B 3/00* (2006.01)

(56) References Cited

U.S. PATENT DOCUMENTS

2014/0157731 A1 6/2014 Perazzo et al.
2018/0164719 A1 6/2018 Stowitts
2019/0084714 A1 3/2019 Lindner

* cited by examiner

APPARATUS FOR DIGITAL PRINTING ON CLOSURES FOR CONTAINERS

This application is the National Phase of International Application PCT/IB2022/051773 filed Mar. 1, 2022 which designated the U.S.

This application claims priority to Italian Patent Application No. 102021000004874 filed Mar. 2, 2021, which applications are incorporated by reference herein.

TECHNICAL FIELD

The object of the present invention is to produce images and writing text on the surface (preferably external) of closing components for containers, and in particular the invention relates to an apparatus for creating a digital ink-jet print on the surface of a cap, for example of the crown type, intended to be applied to close a bottle or a container of glass or similar.

BACKGROUND ART

It is known that various types of caps have long been used to close bottles or jars, in particular glass bottles or jars. The caps include crown caps, screw caps or other caps of various types made of metal.

In the following, for the sake of simplicity and clarity of description, reference will be made only to the crown cap, but it is understood that the device described and claimed in the present application can be useful in several different types of closing components, applied to bottles or containers of glass or the like.

In its simplest form, the crown cap consists of a metal capsule which is applied onto the neck of the bottle by means of a manual or pneumatic capping machine.

It is common practice that of reproducing images on the surface of the cap which will remain outside the bottle, for example a logo associated with the manufacturer of the product contained in the bottle or jar or symbols indicating the characteristics or type of product or writing text with the same purpose.

In the field of crown caps, the images and text are currently reproduced on the caps by printing the logo on the metal sheet which is subsequently deformed to obtain the cap.

Therefore, the printing operation is not carried out on the finished cap but on a semi-finished product (flat metal sheet) which will form the cap afterwards.

Consequently, cap printing is not, in general, very versatile and can only be applied to large-scale production. Indeed, the known printing devices are associated with the cap production line and the end user must also supply the cap manufacturer with the images or texts he wishes to have printed on the surface of the caps.

It is practically infeasible to produce small quantities of customised caps using known technologies, as it is very expensive.

This limitation imposes the production of large numbers of caps, so making production with variations of images for smaller batches of caps economically unacceptable.

For example, if a limited amount of caps from a series of caps were to be modified with a different image, then it would be necessary to wait for the entire batch of caps with the original image to be finished and then the limited number of caps with the modified image could be printed after replacing the pad.

All in all, this is an expensive and time-consuming operation that requires the preparation of several pads, one for each image.

It should also be noted that even a minor change to the image or text to be printed on the caps requires a new pad.

Printing very small batches of caps or even a single cap interspersed with others having different images, is therefore impractical, and in any case not feasible, unless the production of the caps is stopped and the printing pad is replaced, and then the conditions prior to the interruption are restored.

Therefore, even the correction of any, even slight imperfections or modifications involves the suspension of the printing operation, the adjustment or the reconstruction of the pad and therefore long times and substantial costs.

DISCLOSURE OF THE INVENTION

It is an object of the present invention to propose a device which allows images to be reproduced or text to be written on caps in a flexible and easily modifiable way, starting from already produced caps which are ready to be applied on bottles or containers, and in any case in a more versatile way than is possible with the conventional method applied during the production of the caps.

Another object of the present invention is to propose an apparatus allows a user of the caps, that is the final customer or bottler of the product, to manage in an extremely flexible way even small batches of closing components for containers, changing the image or texts to be reproduced as desired and when desired, in an extremely short time and without additional or excessive costs.

A further object of the present invention is to provide an apparatus which allows a customization of the printing on the caps as desired, for example, introducing a cap (or some caps) having a particular logo, in the production sequence of the caps every "n" or another predetermined number of caps, or to produce a limited series, or to print alternatively on the caps a first and a second logo, or a progressively increased number and other variants, all making the line work continuously, without any stop.

Another object of the present invention is to make available an apparatus which allows implementation of the above-mentioned objects in a relatively simple, efficient and economic way.

The above and other objects are fully achieved by means of the apparatus for digital printing on closing components for containers, which is characterised by the contents of the claims below.

BRIEF DESCRIPTION OF DRAWINGS

The technical characteristics of the invention and the advantages thereof are shown in the following description of a preferred but not limiting embodiment. This description refers to the accompanying drawings, which are also provided by way of non limiting example, wherein.

DETAILED DESCRIPTION OF PREFERRED EMBODIMENTS OF THE INVENTION

As specified in the introduction, for the sake of convenience and simplicity of presentation, in the present context reference will be made by way of example only to crown caps, for closing bottles, but it is understood that the described apparatus is intended for use with any other type of metal closing components for containers, which bears on its upper part intended to remain outside the container, an image or text reproduction, such as the logo of the company producing the contained product or indications on the product or other.

Therefore, in the following, the word "cap" or "caps" will refer to any type of metal closing component.

Figure 1:
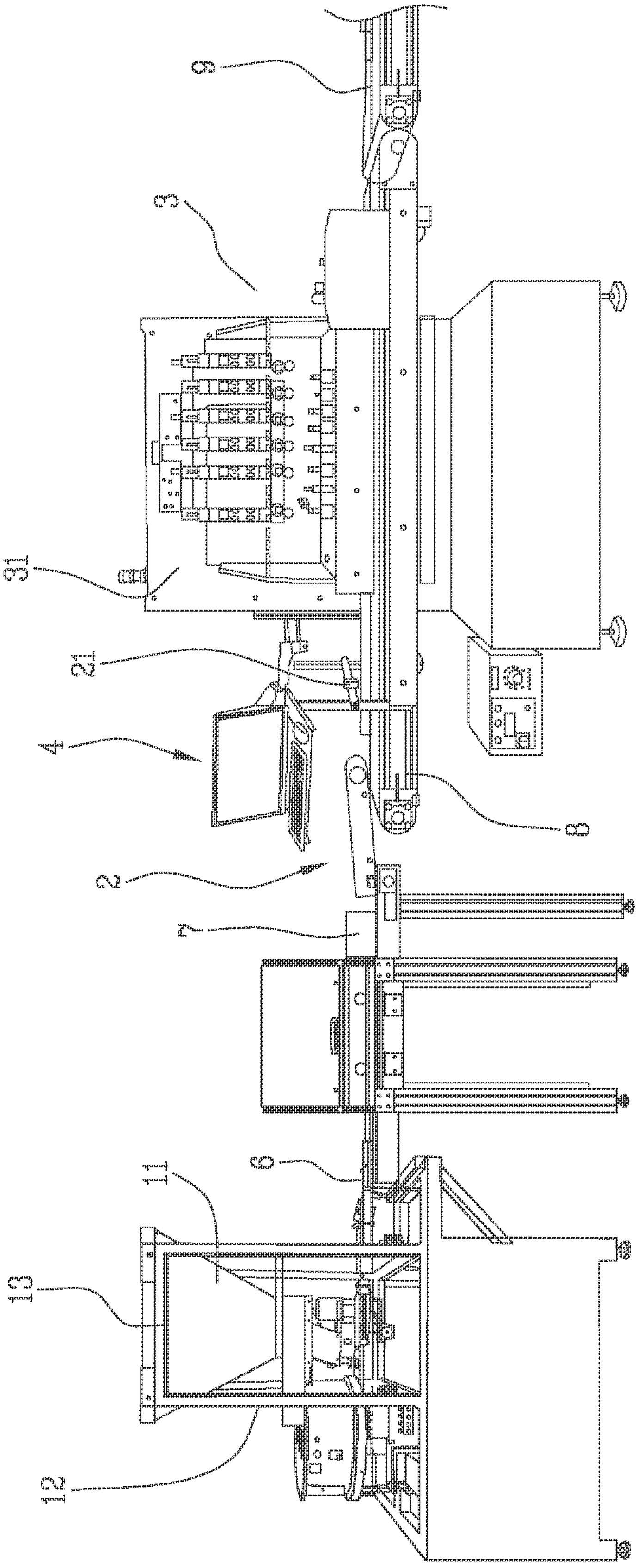
FIG. 1 illustrates the apparatus as a whole in a front view.

With reference to the above mentioned Figures, an apparatus for digital printing of caps or closing components for containers 10 (FIG. 1), intended to work in independent mode (that is as an apparatus functionally autonomous with respect to the cap production line), has been represented by way of not limitative example.

Preferably, said closing components are metallic.

In other words, the apparatus proposed by the present invention is intended to be used by the final user of the caps, who will receive the caps from the manufacturer in raw form, without any graphic or text reproduction on them.

The apparatus herein described is intended for working autonomously on batches of caps so as to digitally reproduce images or text thereon, the number and shapes of the caps being selected and/or modified by the user each time.

According to another aspect, the apparatus 10 comprises a frame (which supports at least some of or all the parts that will be described and/or claimed).

Figure 2:
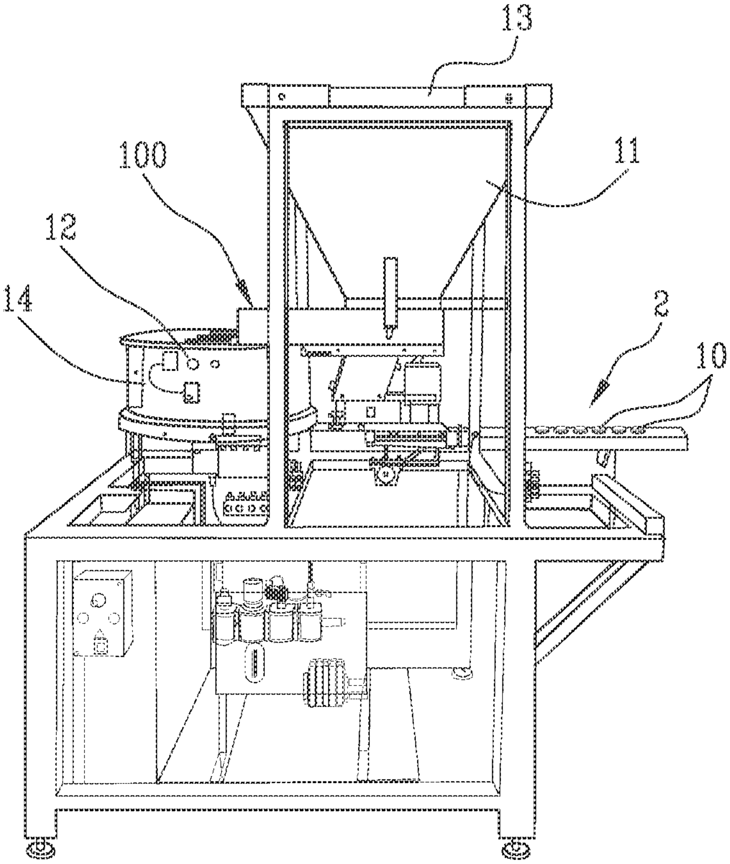
FIG. 2 illustrates a first segment of the apparatus and FIG. 3 illustrates a subsequent segment of the apparatus, in which the printing of the closing components is performed, in accordance with the present invention.

In general, the apparatus described herein comprises a loading container 11, into which the caps 10 are introduced in a sufficient quantity for the batch to be prepared or even for several batches (FIG. 2).

A conveyor line 2 originates from the area of the loading container 11 and conveys the caps 10 to the subsequent working steps for preparation.

In order to place the caps 10 on the conveyor line 2 in an orderly manner, a withdrawing device 12 is provided, which is aimed at taking the caps 10 from the loading container 11 and placing them along the conveyor line 2.

In greater detail, and with reference to the initial portion of the described apparatus, the loading container 11 for containing the caps 10 consists of a hopper 13, which is situated above the conveyor line 2.

On the other hand, the withdrawing device 12 for the caps 10 comprises a vibrating device 100, arranged between the hopper 13 and the conveyor line 2, aimed at releasing the caps 10 one after another (by means of vibrations).

Preferably, said vibrating device 100 comprises a vibrating inclined plane.

The caps are dropped from the vibrating device 100 onto an underlying bowl 14.

The bowl 14 is configured to be driven into rotation (preferably about a vertical axis).

Figure 7:
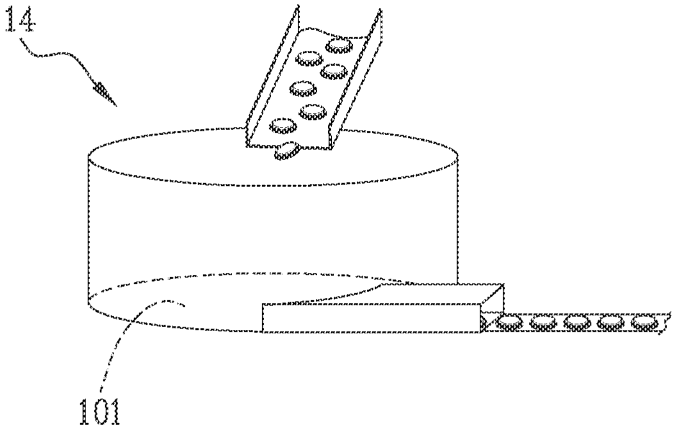
FIG. 7 shows a view of a detail of the present invention.

The bowl 14 is provided with a bottom 101, clearly seen in FIG. 7, also aimed at being driven into rotation.

In order to optimise the operation of placing the caps 10 in a row, the bowl 14 is provided with a peripheral outlet aperture, not seen in the Figure, which opens onto the conveyor line 2 and from which the caps 10 are made to exit one by one.

The bowl 14 is also provided with guides 102 situated at the bottom 101.

The task of such guides 102 is to promptly convey the caps towards the outlet aperture.

The adjustment of the vibration frequency of the vibrating device 100 can determine the frequency of release of the caps, and consequently the number of caps 10 placed on the conveyor line 2 in the unit of time.

Indeed the bowl 14 can accommodate only a limited number of caps (for its optimal operation overcrowding therein must be avoided).

The conveyor line 2 may be subdivided into a plurality of separate, but interconnected, conveyor segments, consisting, for example, of as many conveyors, for example belt conveyors or conveyors consisting of interlocking metal plates.

By way of example, the conveyor line 2 includes an initial segment 6, arranged in the region of the loading container 11.

More preferably, the initial segment 6 originates from the bowl 14.

Furthermore, the conveyor line 2 includes a processing segment 7, in which the the caps 10 are processed.

Preferably but not exclusively, the processing segment 7 is a crown processing segment 7, in which a crown treatment is performed on the caps 10.

According to another aspect, the conveyor line 2 includes a printing segment 8, at which digital printing on the caps 10 is performed, as is better described below.

Preferably but not exclusively, the printing segment 8 is configured to print on the outer surface of the caps 10.

According to still another aspect, the conveyor line 2 includes a quality check segment 9, in which the quality of the printing performed on each cap is verified.

In the crown processing segment 7, the conveyor preferably comprises a series of intermeshed magnetic plates aimed at magnetically retaining the caps 10.

Farther on, along the printing segment 8 of the conveyor line 2 following the verification segment 7, the apparatus 1 comprises a digital printing station 3, including a digital printing device 31.

Figure 3:
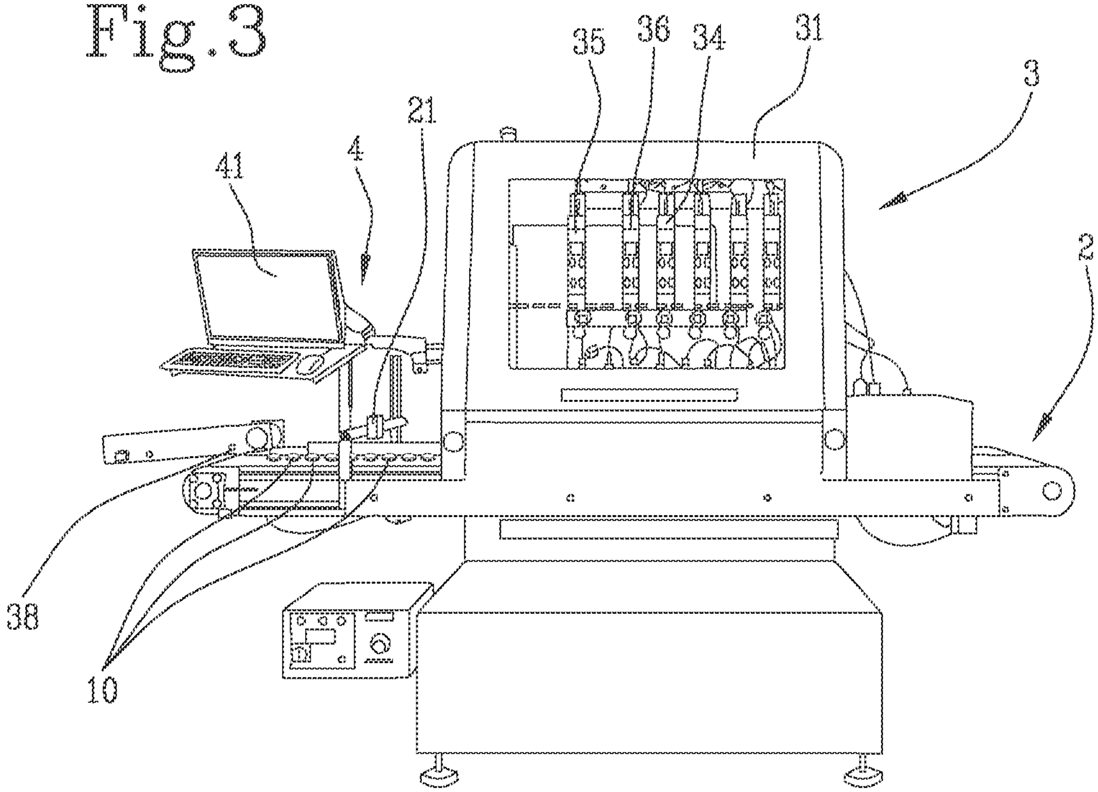
Figure 4:
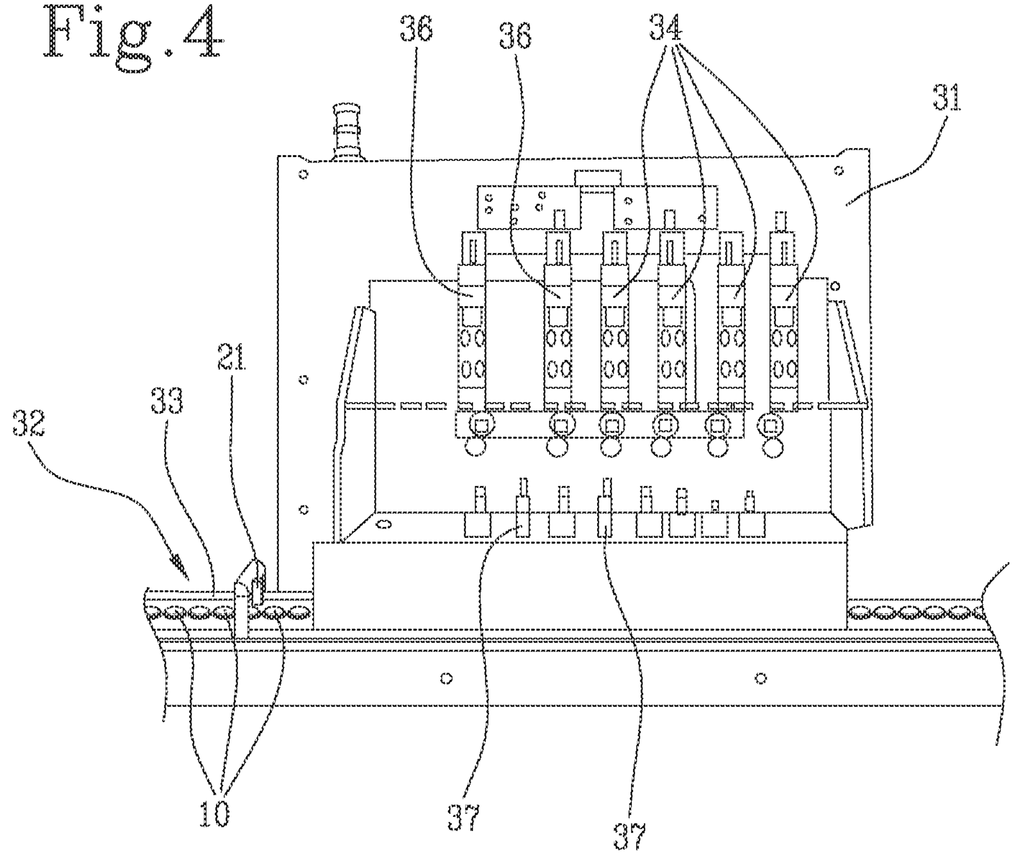
FIG. 4 and FIG. 5 illustrate some details of the section of the apparatus in which the printing of the closing components is performed.

In detail, the digital printing device 31 of the digital printing station 3 includes a series of ink-jet nozzles (print heads) 34, disposed in series one after another along the conveyor line 2, as seen in FIGS. 3 and 4.

Preferably, the nozzles are arranged above the conveyor line 2.

Preferably, the nozzles print.

According to the ink-jet technology droplets of ink are pushed to settle on the printing area producing the image to be printed.

The area in which the ink droplets are released is electronically controlled (so it is possible to create desired graphic effects).

The close placement of ink droplets of the three basic colours allows to create any possible colour shade, as well as all other derived colours.

The ink-jet nozzles 34, suitable for operating in four-colour process, are activated in succession on each cap 10, to obtain a graphic and/or text reproduction selected and/or modified by the user, as better specified below. The image is identified by data in CMYK format, representing the three basic colours in addition to the black colour.

Each of the ink-jet nozzles 34 includes a head that releases fluid ink directly, taking it from special reservoirs and due to relative movement between the caps and the heads, the desired image is formed by appropriate control of the ink release.

The ink-jet nozzles 34 are in fact controlled and operated by a command and control unit 4, which activates the nozzles in the correct sequence at predetermined times, depending on the position of the caps on the printing segment 8 of the conveyor line 2, detected by a position sensor 21, situated upstream of the digital printing station 3.

The position sensor 21, being part of the apparatus 1 and situated in a suitable position and at a suitable distance from the conveyor line 2, detects the position of each cap 10 passing thereunder and provides the data to the command and control unit 4.

The command and control unit 4 determines the activation times of the four-colour process of the ink-jet nozzles 34.

It should be noted that, in an inlet section 32 of the digital printing station 3, which precedes the series of ink-jet nozzles 34, there is at least one additional ink-jet nozzle 35, aimed at covering the upper surface of the caps 10 with a further layer of additional material (a colour, a primer, a fixative, etc.).

Preferably, said additional layer is an additional colour (preferably white).

It should also be noted that such additional colour may be used as a background colour and/or for images, i.e. in the latter case it can define an active colouring of the images (and not just a background).

The background colour can generally be white, but other colours can also be used if a black or coloured background is more useful or preferable.

Next to the additional ink-jet nozzle 35 provided for covering the caps 10 with a background colour, a drying UV device 37 is provided, aimed at drying the background colour applied to the caps before the release of the colours for reproduction of the images by the nozzles 34.

However, it may be preferable not to dry the background colour completely, but only partially, in order to achieve better adhesion of the colours in the next segment.

Furthermore, it may be necessary or preferable to apply a second layer of background colour before the image production, for example to obtain a whiter background if the material of the cap does not allow doing it with only one layer.

For this eventuality, a second additional ink-jet nozzle 36 is arranged in series after the first additional ink-jet nozzle 35 and aimed at covering the caps 10 with a second layer of background colour.

The second additional ink-jet nozzle 36 is also followed by a drying UV device 37, for drying the whole or part of the second layer of background colour applied to the caps 10.

All the nozzles, both the nozzles 34 operating in four-colour process and the additional nozzles 35, 36 for applying the background colour, are operated and controlled by the command and control unit 4.

In order to allow the user to interact with the command and control unit 4, for example in order to allow selecttion and/or modification of a printing image which will be then produced on the caps 10, a user interface device 41 is provided, being part of the apparatus 1.

The user interface device 41 is, by way of non-limiting example, a keyboard and a video terminal.

Preferably, the user interface device 41 is configured to allow the user to recall from memory or from an external medium, such as a USB stick or a web page via the internet, or otherwise, the images and/or texts that are intended to be produced on the caps 10.

It is also possible to prepare a proper database containing a plurality of product types associated with corresponding images and texts. This makes it possible to simplify and speed up the operational preparation of the nozzles with reference to the parameters already present in the database.

The control panel is equipped with a processor programmed to display on the video terminal the control interface and a range of graphic shapes prepared for printing on the caps.

Preferably, the initial entered data may also include data representing the dimensions of the cap or metal closing component on which the graphic representation is to be printed, or data representing the standard dimensions or formats of the caps or closing components may be entered by the operator.

If the user considers it necessary or if he/she prefers to do so, he/she can modify the available image shapes by a graphics routine or program and then select those to be produced on the caps, possibly adding or modifying text parts.

Using the interface device 41 the user selects the numbers of caps 10 that will make up the batches to be printed and he can arrange the automatic change of the graphics created on the caps, once the various pre-ordered batches have been completed, or he can insert variations on a number of caps selected each time, even just one cap out of a whole batch.

The use of the digital printing system allows maximum flexibility and versatility, with the possibility of any kind of variations of the images on the caps.

On the basis of the received instructions, the command or control unit 4 sends to the digital printing device 31 the instructions necessary to activate in the appropriate way both the nozzles 34 operating in four-colour process and the additional nozzles 35, 36 for the application of the background colour.

Figure 5:
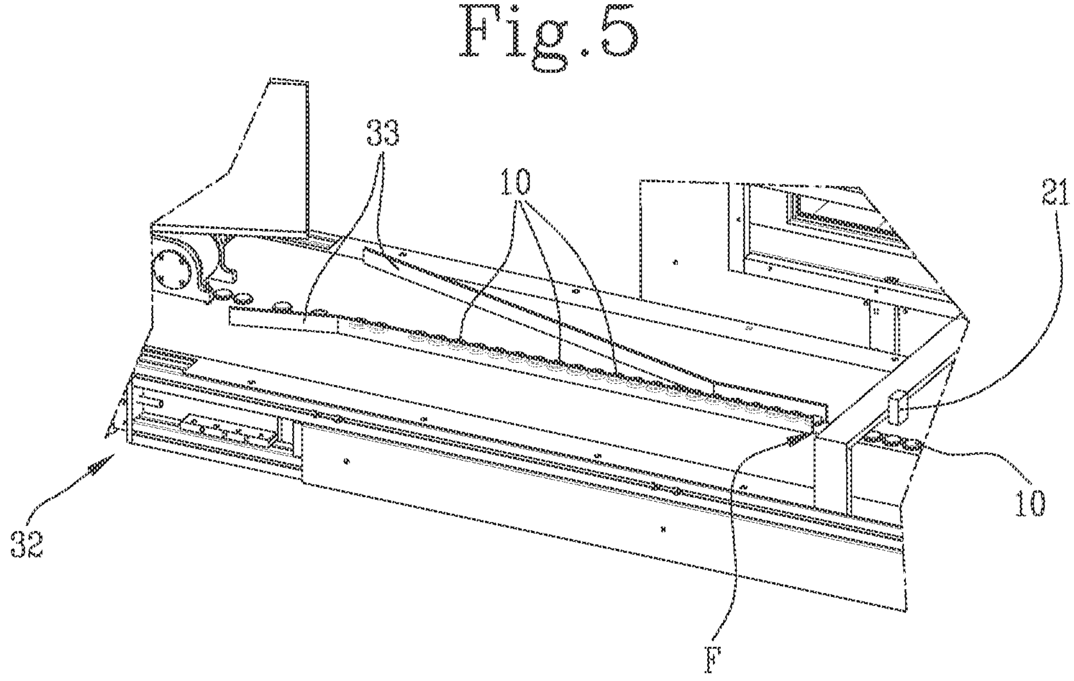
Figure 6:
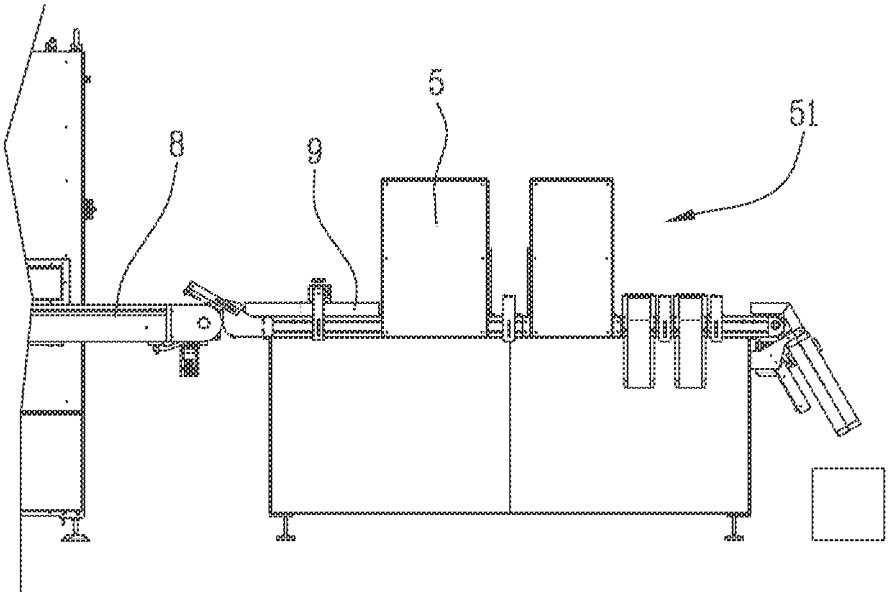
FIG. 6 illustrates a terminal segment of the apparatus according to the present invention.

Note that a lateral abutment element 33 is situated in the region of an inlet section 32 of the digital printing station 3, which is aimed at aligning the caps 10 according to an ordered row F entering the digital printing station 3 (FIG. 5).

The presence of the lateral abutment element 33 improves the caps alignment and thus the accuracy of the images production on the caps.

The lateral abutment element 33, which is an angled bar, systematically moves the caps 10 towards the centre of the belt conveyor forming the printing segment 8 of the conveyor line 2.

A second bar (not illustrated), possibly rectilinear, may be provided opposite to the bar constituting the lateral abutment element 33 and limiting the movements of the caps in the direction opposite to the bar 33.

In any case, both bars do not continue beyond the inlet of the digital printing device 31 in order to avoid that friction against the moving caps 10 makes the latter rotate and compromise the detection of their position.

Moreover, according to the four-colour technique, the colours are composed in the different shades by bringing together different dots of the three basic colours, and therefore maintaining the position of the caps 10 on the conveyor belt is essential for the successful graphic reproduction on the caps.

Once the application of the colours by the four-colour nozzles 34 of the digital printing device 31 has been completed, a UV drying station 5 is situated after the digital printing station 3 for fixing the printed images created on the caps 10. The operation of drying the colours completes the very printing of the caps 10.

Finally, downstream of the digital printing station 3 and after the UV drying station 5, a quality check station 51 can be provided, to which the caps 10 are carried from the quality check segment 9 of the conveyor line 2.

The task of the quality check station 51 is to check the quality of the printed images produced on the caps 10 and to reject those caps on which the printing has not been produced in an optimal manner.

From the above description of the apparatus for digital printing of caps or metal closing components 10 for containers, the advantages deriving from its adoption with respect to the known art are evident.

Since the apparatus is able to operate autonomously, and thus it is not inserted in a more complete production process of the caps, the graphics is obtained in an extremely flexible way. Therefore it is an apparatus completely independent from any plant producing the caps, which therefore allows the end user to act and modify the image shown by the caps after their production, even in the last moment before their application on bottles or other containers.

This feature, together with digital printing and due to the lack of expensive operations of prior preparation of pads, "clichés", printing dies, etc., is extremely suitable for customisation of small batches of caps or even single caps, between the caps of one batch or between one batch and the next.

In other words, the apparatus provides the operator with all the hardware and software tools to enter the image to be printed on the caps into the system, by means of the suitably programmed electronic processor, simply and quickly.

This image may include wordings and/or graphic decorations and be composed of one or more coloured portions and the apparatus operates in such a way that what is actually printed on the caps is substantially identical to the image inserted by the operator, especially in terms of colour rendering.

According to another aspect, the apparatus 1 includes a remote communication module (not illustrated), configured to remotely receive commands.

The remote communication module is preferably configured to allow a connection to a communication network (e.g., internet), in particular to connect through such network to a remote processor.

It is possible to receive instructions on images/graphics to be printed on the caps through the communication established with the remote computer: in this way, the apparatus 1 can be controlled from remote.

Preferably, the remote communication module is connected to the electronic processor of the apparatus 1, in order to control the digital printing station 3 and to print on the caps 10 the predetermined graphics/images sent via the remote computer.

The invention claimed is:

1. An apparatus for digital printing on closing components for containers, comprising:

a loading container configured for containing a plurality of closing components for said containers;

a conveyor line for said closing components;

a withdrawing device for withdrawing said closing components from said loading container, aimed at taking said closing components from said loading container and placing said closing components along said conveyor line;

a digital printing station, arranged along said conveyor line and comprising a digital printing device configured for executing a graphic and/or text reproduction on each of said closing components;

at least one position sensor, arranged upstream of the digital printing station, configured for detecting a position of at least one of the closing components passing along said conveyor line;

a command and control unit, to which said position sensor is connected to provide information about the position of the closing components situated on said conveyor line and acting on said digital printing device to activate said digital printing device at a predetermined times, which depends on said detected position;

a user interface device, configured to allow the user to interact with said command and control unit to select and/or modify an image to be printed, according to which said command and control unit sends control instructions to said digital printing device to reproduce the selected and/or modified image on said closing components;

wherein said digital printing device comprises a series of ink-jet nozzles arranged along said conveyor line and operating in four-color process in succession to reproduce said selected and/or modified image on said closing components;

wherein at least one additional ink-jet nozzle aimed at covering said closing components with a first layer of background color is positioned at an inlet section of said digital printing station preceding said series of ink-jet nozzles operating in four-color process;

at least one UV device configured for only partially drying said background color applied to said closing components, situated downstream of said additional ink-jet nozzle aimed at covering said closing components with a background color and upstream of at least certain ones of said series of ink-jet nozzles operating in four-color process.

2. The apparatus for digital printing on closing components for containers, according to claim 1, wherein said loading container comprises a hopper located above said conveyor line.

3. The apparatus for digital printing on closing components for containers, according to claim 2, wherein said withdrawing device comprises a vibrating device situated between said hopper and said conveyor line and configured for releasing said closing components one after another.

4. The apparatus for digital printing on closing components for containers, according to claim 2, wherein said withdrawing device for said closing components comprises a bowl device situated between said hopper and said conveyor line and including a peripheral outlet aperture from which said closing components are made to exit one by one.

5. The apparatus for digital printing on closing components for containers, according to claim 1, wherein said conveyor line of comprises one or more conveyor segments at least some of which are at least partially magnetic.

6. The apparatus for digital printing on closing components for containers, according to claim 1, wherein said digital printing station includes an inlet section in which a lateral abutment element is situated, configured for aligning said closing components according to an ordered row at the inlet of said digital printing station.

7. The apparatus for digital printing on closing components for containers, according to claim 1, and further comprising at least one second additional ink-jet nozzle configured for covering said closing components with a second layer of background color is positioned at said inlet section of said digital printing station preceding said series of ink-jet nozzles operating in four-color process.

8. The apparatus for digital printing on closing components for containers, according to claim 1, and further comprising, following said digital printing station, a drying station using UV light for fixing said printing graphics on said closing components.

9. The apparatus for digital printing on closing components for containers, according to claim 1, and further comprising a quality check station situated downstream of said digital printing station and configured for checking a quality of the printed images made on said closing components.

10. The apparatus for digital printing on closing components for containers, according to claim 1, wherein said closing components are crown caps and said containers are bottles.

* * * * *